(12) United States Patent
Monari et al.

(10) Patent No.: US 9,176,495 B2
(45) Date of Patent: Nov. 3, 2015

(54) METHOD TO PREVENT INTERFERENCE AND DETECT COLLISION BETWEEN MECHANICAL MEMBERS

(71) Applicant: GIMA TT S.R.L., Ozzano dell'Emilia (IT)

(72) Inventors: Iuri Monari, Anzola dell'Emilia (IT); Fiorenzo Draghetti, Medicina (IT)

(73) Assignee: GIMA TT S.R.L. (IT)

( * ) Notice: Subject to any disclaimer, the term of this patent is extended or adjusted under 35 U.S.C. 154(b) by 24 days.

(21) Appl. No.: 14/351,778

(22) PCT Filed: Oct. 11, 2012

(86) PCT No.: PCT/IB2012/002026
§ 371 (c)(1),
(2) Date: Apr. 14, 2014

(87) PCT Pub. No.: WO2013/072725
PCT Pub. Date: May 20, 2013

(65) Prior Publication Data
US 2014/0316569 A1     Oct. 23, 2014

(30) Foreign Application Priority Data
Oct. 13, 2011   (IT) .............................. MI2011A1868

(51) Int. Cl.
*G05B 19/18* (2006.01)
*G05B 15/00* (2006.01)
*G05B 19/4061* (2006.01)

(52) U.S. Cl.
CPC .. *G05B 19/4061* (2013.01); *G05B 2219/37622* (2013.01); *G05B 2219/37632* (2013.01); *G05B 2219/49157* (2013.01)

(58) Field of Classification Search
None
See application file for complete search history.

(56) References Cited

U.S. PATENT DOCUMENTS

2003/0225479 A1    12/2003   Waled

FOREIGN PATENT DOCUMENTS

EP   1276027 A2   1/2003
EP   1652634 A1   5/2006

OTHER PUBLICATIONS

Written Opinion and Search Report from PCT/IB2012/002026 mailed Mar. 8, 2013.

*Primary Examiner* — Bhavesh V Amin
(74) *Attorney, Agent, or Firm* — Calfee, Halter & Griswold, LLP

(57) ABSTRACT

Method to control the interference and/or collision between mechanical members of at least two operating or one operating unit with respect to fixed positions. At least one operating unit is associated with a position detector or with a position simulator, and is equipped with an electric which drives a mechanical member. The method is managed by a management and control unit. The control of the operating units occurs in two phases, verifying point-by-point the position of the mechanical member as a function of the current dynamics and the braking or acceleration times and spaces (first phase), and verifying the intensity of point-by-point current supplied to at least one electric motor (second phase).

15 Claims, 3 Drawing Sheets

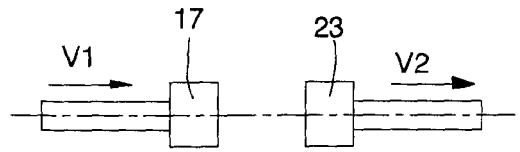
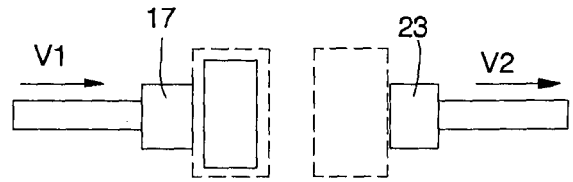
fig.6          fig.7
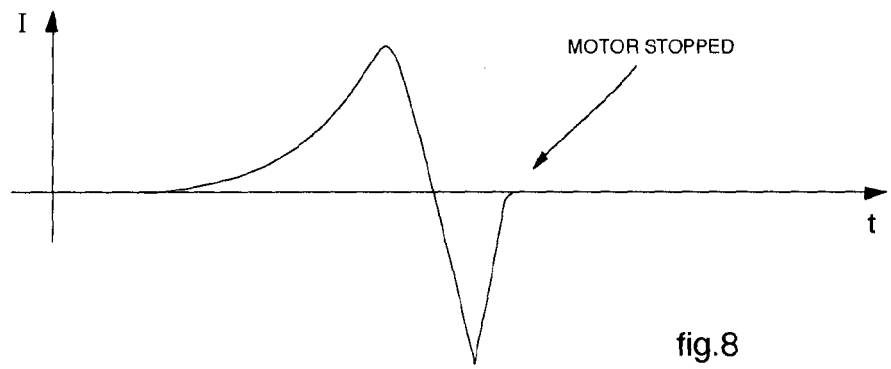
fig.8
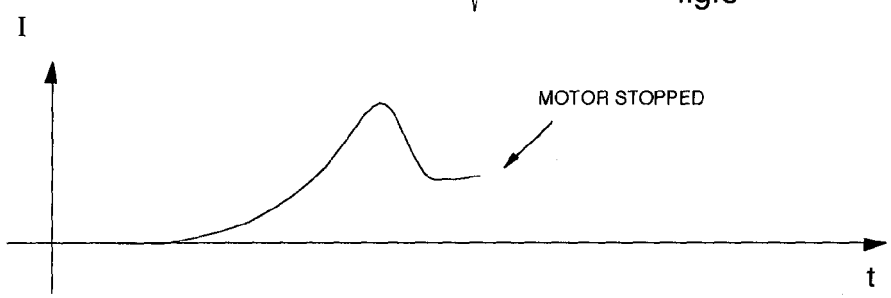
fig.9
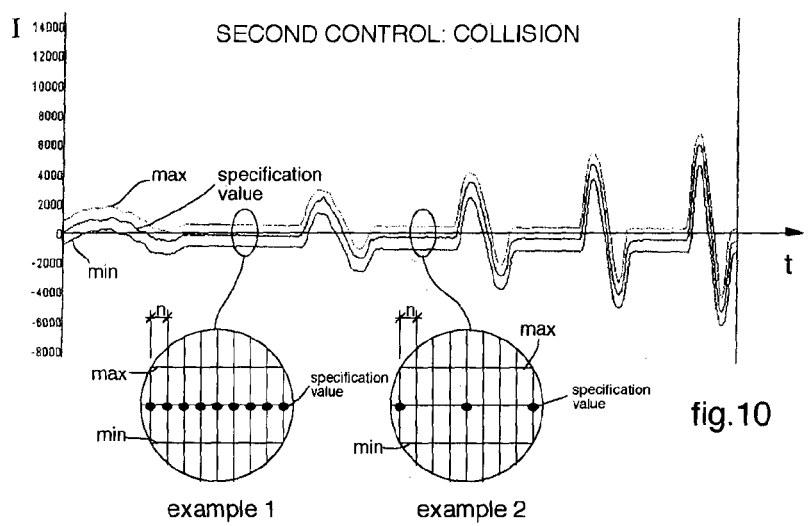
fig.10

METHOD TO PREVENT INTERFERENCE AND DETECT COLLISION BETWEEN MECHANICAL MEMBERS

CROSS-REFERENCE TO RELATED APPLICATIONS

This application is the U.S. national phase entry of PCT/IB2012/002026, with an international filing date of 11 Oct. 2012, which claims the benefit of Italian Application Serial No. MI2011A001868, with a filing date of 13 Oct. 2011,the entire disclosures of which are fully incorporated herein by reference.

FIELD OF THE INVENTION

The present invention concerns a method particularly suitable to control the interference and/or collision of mechanical members moved by electric motors, which for example can be the brushless type. The invention also concerns the connected system operating in connection with a substantially sequential logic.

BACKGROUND OF THE INVENTION

Automation units are known, comprising one or more operating units comprising a drive member, a mechanical member, a position detector mean, that is, an entity that simulates mathematically the position of the drive shaft. The mechanical members of the operating units are therefore normally moved by electric motors, and are connected to the shaft of the latter directly or by means of kinematic reduction units. The motors, commanded by a central management and control unit, drive the operating units in pre-established cycles and in a coordinated manner, to obtain a desired interaction, for example so that they interact with a product in order to work it.

One disadvantage of such work units is that, in the event of blockages, yielding, wear or other anomalies, a phase displacement is created between the point-by-point position assumed and the theoretical or desired position of the mechanical members.

For this reason, known work units comprise clutches, mechanical releases or energy absorbers that intervene in the event of collisions in order to reduce damage.

One purpose of the present invention is to provide a method to control interference that prevents collisions and/or to detect the collision between the mechanical members of operating units without using clutches, mechanical releases or other.

Another purpose of the present invention is to obtain a system for moving the mechanical members that is quick, coordinated and reliable, controlling, providing and/or preventing interference and detecting collisions quickly enough to prevent breakages.

Another purpose of the present invention is to perfect a method to control interference and collisions which simplifies the mechanical members, making them more economical, easy to maintain, simple to calibrate and start the cycle.

Another purpose is to be able to manage the operating units, performing interdependent processes, with high cadence, that is, up to 600 cycles per minute and more.

By mechanical member we mean cranks, pantographic systems, cams or other according to the specific requirements.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a method to control the interference and/or collisions according to the present invention is applied to an automation unit operating in connection with a substantially sequential logic. The automation unit comprises the control of a first operating unit with respect to a second operating unit or with respect to possible contrast elements. The mechanical members carry out their operating cycle in a region where interference or collisions can occur.

According to the present invention, in the case of two operating units, the method comprises a first phase of preventing interferences in which the management and control unit detects the position of at least one shaft of the motor continuously or with a desired periodicity.

According to a variant, the detection is made in relation to the point-by-point position of the mechanical member. Said detection is made considering the braking time and space of the specific operating unit, starting from its point-by-point dynamics. The position is detected and compared with the position of possible interference with possible contrast elements.

According to a variant, the reciprocal point-by-point position of one mechanical member with respect to the other mechanical member is controlled continuously or according to said periodicity.

According to another variant the position of the mechanical members is detected by respective position detectors directly associated with the shafts of the electric motors, or with the mechanical members themselves or after a possible reduction, or again in relation to a position simulator, for example a mathematical position simulator.

According to another variant, the position of the drive shafts is detected by controlling the temporal and point-by-point position inside the respective cycles.

It is also a variant to detect the positions as a function of the angular position of the drive shaft.

According to the invention, there is a second phase of detecting the collisions, in which the cycle is divided into "n" sub-phases consisting of elementary angular units or units of time. In relation to every sub-phase "n" or multiple of "n", the actual current is compared with the reference current, and the current supplied is limited point-by-point so that it does not exceed the expected point-by-point threshold. The current error in absolute terms is compared with a window of acceptability made from two thresholds applied to the theoretical point-by-point reference current, of which one is bigger and one is smaller than the reference current value. This allows to detect collisions in both acceleration and deceleration, as well as to detect if the mechanics change inertia suddenly, which effect is associable for example with a breakage.

According to one embodiment of the present invention, the management program of the two operating units provides all the physical conditions in which at least one operating unit can be, and situations that can lead to interference or collisions.

According to a variant, the program comprises all the physical conditions of both operating units.

In the event that both operating units are controlled, the point-by-point detections of the position of both the drive shafts are made. Based on these detections, the management and control unit compares the point-by-point position of each operating unit in relation to the future position of possible interference. This comparison is done considering the dynamics with which the members are proceeding and the dynamics with which the members are able to stop, using the maximum allowed torque. If the point-by-point position of one operating unit, as the operating cycle continues, indicates the possibility of interference with the other operating unit, the management and control unit intervenes.

If for any reason no control is made of the interference, the collisions control detects it and proceeds with the blocking, thus preventing possible breakages.

According to the invention the two controls can be independent even if they function simultaneously.

The first control (first phase) manages the reciprocal point-by-point coplanar positions in view of the expected future positions. The management considers the possible braking space continuously, or the space for deceleration/acceleration, of one and/or the other operating unit. The second control (second phase) manages the current supplied to the electric motors so that if the current, which must be near the theoretical reference value calculated as a function of the point-by-point inertia and point-by-point acceleration of the mechanical member, were to be outside the minimum-maximum band allowed for every sub-phase "n" of the cycle, or multiple of "n" (see FIG. 10), the second control intervenes and proceeds with the blocking.

The second control also limits the current to the maximum limit allowed point-by-point (point-by-point reference+max tolerance threshold).

According to another embodiment, the theoretical reference current value is self-learnt as a function of the cadence of the cycle, the position of the sub-phase "n" and memorized in tables.

According to another embodiment, the two controls are managed by the same program, but on two autonomous levels.

The method also provides one or more central control units, or management and control units, which control and command the operating units.

In one embodiment, a method according to the present invention is used to control the interference and/or collisions between mechanical members of at least two operating units or at least one operating unit with respect to fixed positions for the execution of an operating cycle, wherein the at least one operating unit is associated with a position detector or a position simulator, and is equipped with at least one electric motor which drives a mechanical member.

In some embodiments, the method is managed by a management and control unit and provides that the control of the operating units occurs in two phases, of which a first phase of preventing interferences in which at a determinate instant of time the actual position of the mechanical member is verified as a function of the current dynamics and the braking or acceleration times and spaces, and a second phase of detecting the collisions in which, at a determinate instant of time, the actual intensity of current supplied to the at least one electric motor is verified, dividing said operating cycle into "n" sub-phases, in relation to every sub-phase "n" the actual current being compared with a reference current in order to identify a current error in absolute terms, the current error in absolute terms being compared with a window of acceptability made from two thresholds applied to the reference current value, of which one is bigger and one is smaller than the reference current value, limiting in the determinate instant of time the current supplied so that it does not exceed a threshold value defined for the determinate instant of time; wherein for each of the sub-phases "n" or multiples of "n", there is an action of self-learning of the reference currents.

In variant embodiments, for the self-learning action, the reference currents are memorized in tables, using self-learning procedures, said tables being interrogated in order to obtain the reference to be used, comparing it with the actual value of current supplied.

BRIEF DESCRIPTION OF THE DRAWINGS

These and other characteristics of the present invention will become apparent from the following description of one form of embodiment, given as a non-restrictive example with reference to the attached drawings wherein:

FIGS. 6 and 7 show schematically two cases of relative interference between mechanical members;

FIGS. 8 and 9 are two schematic graphs of the supply current of an electric motor at the moment it stops following a detection of interference or collision;

FIG. 10 is a graph of the current supplied to an electric motor and corresponding intervention limits of the control;

To facilitate comprehension, the same reference numbers have been used, where possible, to identify identical common elements in the drawings.

DETAILED DESCRIPTION OF SOME PREFERENTIAL FORMS OF EMBODIMENT

Figure 1:
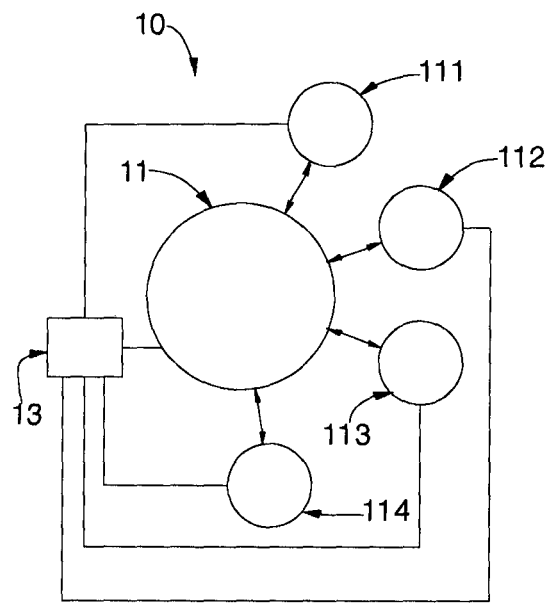
FIG. 1 is a schematic view of an automation unit according to the present invention.

With reference to FIG. 1, the method to control interference and/or to control collisions is applied to an automation unit 10 which comprises an operating unit 11 that cooperates with a plurality of operating units 111, 112, 113, 114. The operating units 11, 111, 112, 113, 114 are governed by a management and control unit 13. As we said, the two methods can operate in different formulations, that is, they can:

operate in distinct and autonomous mode operate in an integrated but independent mode operate in integrated and substantially sequential mode.

Figure 2:
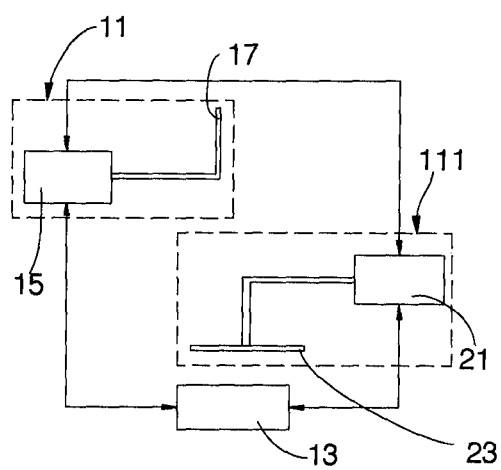
FIG. 2 shows schematically a possible interaction between operating units and a control unit.

With reference to FIG. 2, the operating unit 11 has a position detector so that it does not allow phase displacements or drifts, and an electric motor 15.

The shaft of the electric motor 15 is connected to a mechanical member 17. In the same way, another operating unit 111 is associated with its own position detector and an electric motor 21 directly connected to a mechanical member 23. The mechanical members 17 and 23 follow trajectories that interfere with each other (see FIG. 2).

The position detector can be associated with, or also with, the mechanical member 17, 23 or with the electric motor 15, 21.

The position detector mean of the operating unit 11, 111 is suitable to communicate to the management and control unit 13 the point-by-point position of the mechanical members 17 or 23.

The management and control unit 13 receives data from the position detector mean and processes them continuously, or according to a desired cadence.

The management and control unit 13 has inside itself the operating diagrams of every operating unit 111, 112, 113 and 114. In the operating diagrams associated with the position of the individual drive shafts, or operating unit, a condition of possible interference is also provided.

Furthermore, for every point-by-point current intensity (see FIG. 10), there is a minimum and maximum shift with respect to the calibrated value in the operating diagrams. The shift serves to control collisions between the mechanical members 17, 23.

Consequently, the management and control unit 13 on each occasion controls the position of each operating unit 11, 111, 112, 113 and 114, taking into account the braking time and space of both operating units 11, 111, 112, 113 and 114 in relation to another operating unit. The control thus occurs in pairs of operating units 11, 111, 112, 113 and 114, simultaneously and continuously, on both operating units 11, 111, 112, 113 and 114, analyzing both the reciprocal angular point-by-point position with respect to the theoretical coplanar position, and also the intensity of current absorbed.

According to the example, the management and control unit 13 controls the operating unit 11 with respect to the operating unit 111 and the operating unit 111 with respect to the operating unit 11; the operating unit 11 with respect to the operating unit 112 and the operating unit 112 with respect to the operating unit 11 etc.

The management and control unit 13 thus performs indirectly a multiple control (with regard to the nearby mechanical members) of the position of every mechanical member 17, 23, verifying the point-by-point spatial position to control that there is no phase displacement between the point-by-point position and the theoretical one. If the phase displacement causes the point-by-point position to be located near where any interference can start, the program intervenes.

According to the invention, the whole work cycle of each operating unit 11, 111, 112, 113 and 114 is divided into phases, each of which corresponds to an angular sector of the axis of the electric motors 15 and 21. Moreover, the work cycle is divided into elementary angular units or sub-phases, which have limited amplitudes characterized by the formula α/n where α is the angle, which can be a round angle or more, necessary for the drive shaft to develop the work cycle, and n is the division factor or sub-phase.

According to a variant, the work cycle can be divided into sub-phases "n" which are functions of the cycle time. According to another variant, the sub-phases "n" depend on a mathematical entity.

It is also a variant to consider that the cycle is performed in a hypothetical round angle.

The management and control unit 13 comprises data memorization means in which the phases of the work cycle to be carried out are memorized, divided by elementary units. The management and control unit 13 therefore contains the specific positions of each phase and each sub-phase "n". It also contains other parameters of the operating units 11, 111 such as for example the inertia that the mechanical members 17 and 23 have on each occasion and the current with the values that are on each occasion minimum and maximum with respect to the design specifications.

The interferences can be the absolute type (FIG. 3, 4 or 5) if the mechanical members 17 and 23 move along axes which form an angle other than zero, or relative (FIGS. 6 and 7) if they move substantially on the same axis.

Figure 3:
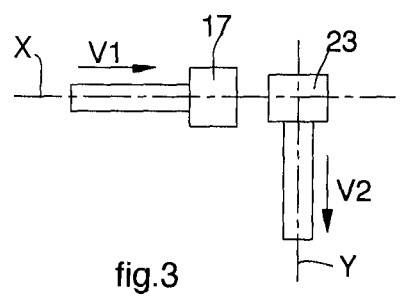
FIGS. 3, 4 and 5 show schematically some cases of absolute interference between mechanical members.

FIG. 3 shows a pair of mechanical members 17 and 23. A first mechanical member 17 moves at speed V1 along a first axis X toward a second mechanical member 23 that moves at speed V2 along a second axis Y.

In accordance with the values shown in a database, the management and control unit 13 calculates, for every elementary unit "n" or multiple of "n", taking into account the braking times and spaces, if there will be any interference between the two mechanical members 17 and 23. If so, the management and control unit 13 calculates the braking or acceleration space and time, guaranteed respectively of the first and/or second mechanical member 17, 23, and proceeds by staggering the intervention so as to prevent interference.

Figure 4:
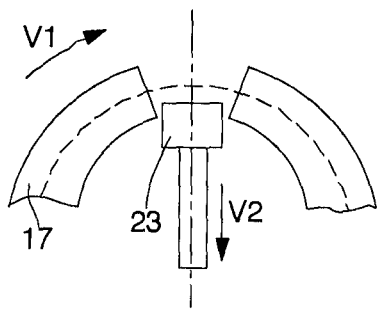
Figure 5:
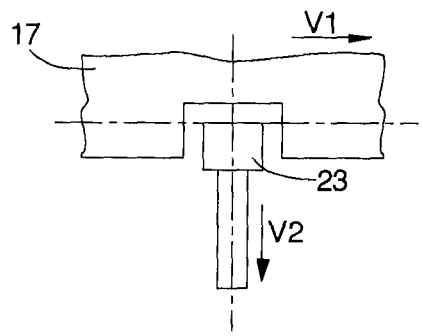

In the same way, in FIGS. 4 and 5, a first mechanical member 17 rotating at peripheral speed, or moving at speed V1, can interfere with a second mechanical member 23, moving at speed V2. The management and control unit 13 performs the same operations as in the previous case.

With reference to FIGS. 6 and 7, two mechanical members 17 and 23 move respectively at a first speed V1 and a second speed V2 on the same axis and in the same direction. In this case, for every sub-phase "n" or multiple of "n", the management and control unit 13 calculates the distance between the two mechanical members 17 and 23 and, depending on their dynamics and taking into account the stopping times and spaces, foresees if any interference will occur. If so, the management and control unit 13 calculates the stopping times and coordinates of at least one of the two mechanical members 17 and 23 to prevent the collision, and commands braking or acceleration.

The braking or acceleration is actuated by supplying to the corresponding motor a current that, for example, can have the development shown in FIG. 8, for braking and clamping the mechanical member 17 or 23 by the electric motor 15 or 21. In other embodiments, the current can have a development similar to that shown in FIG. 9 in order to slow down or stop the mechanical member 17 or 23 due to a collision with infinite deceleration.

The braking time and space of the interfering mechanical members 17 and 23 depends on the inertia they have and the intensity of the current that has been supplied to the electric motors 15 and 21 by the management and control unit 13.

The management and control unit 13 manages and controls the reciprocal position of the mechanical members 17 and 23. The management and control unit 23 also memorizes in the internal memorization means the currents supplied by the motors during a normal cycle or self-learning cycle, depending on the cadence of the cycle. This mechanization is carried out so that it can be compared with the point-by-point currents; this comparison serves to deduce the possible error that could cause the control to intervene, immediately carrying out a deceleration or a stoppage of the mechanical members 17, 23 involved.

This self-learning/memorization technique allows to manage friction, jogging, wear and replacements/substitutions in a transparent manner. The management and control unit 13 updates the database according to the information gathered by the position detectors and gets data from it in order to manage, in an efficient and point-by-point manner, the possible interferences or collisions between the mechanical members 17 and 23.

In some embodiments, in the self-learning action the reference currents are memorized with self-learning procedures in tables associable with said database, said tables being interrogated in order to obtain the reference current to be used, comparing it with the actual value of current supplied.

In some embodiments, the self-learning action is performed in relation to each sub-phase "n".

In order to guarantee that the collision control functions correctly, a correction factor is added to the reference current, said correction factor being due to the acceleration or deceleration expected in the cycle (variations in cadence of the cycle or stops and re-starts of the individual operating unit).

The collision control provides a current limit that the management and control unit 13 can effectively supply as a function of the sub-phases "n" or multiples of "n".

To this purpose, in relation to every sub-phase "n", the actual intensity of current is compared with a reference current in order to identify a current intensity error in absolute terms. The management and control unit assigns to each of the sub-phases "n" or multiple of "n" a determinate limit (min and max thresholds) of current intensity that must not be exceeded, of which one is bigger and one is smaller than the reference current value, to define a window of acceptability made from the two thresholds applied to the reference current value. If the current intensity error in absolute terms goes beyond the window pre-determined on a theoretical level and memorized in the database (see FIG. 10), the management and control unit 13 interprets this as a collision and immediately performs a deceleration or stoppage of the mechanical members involved, and possibly those connected.

Figure 11:
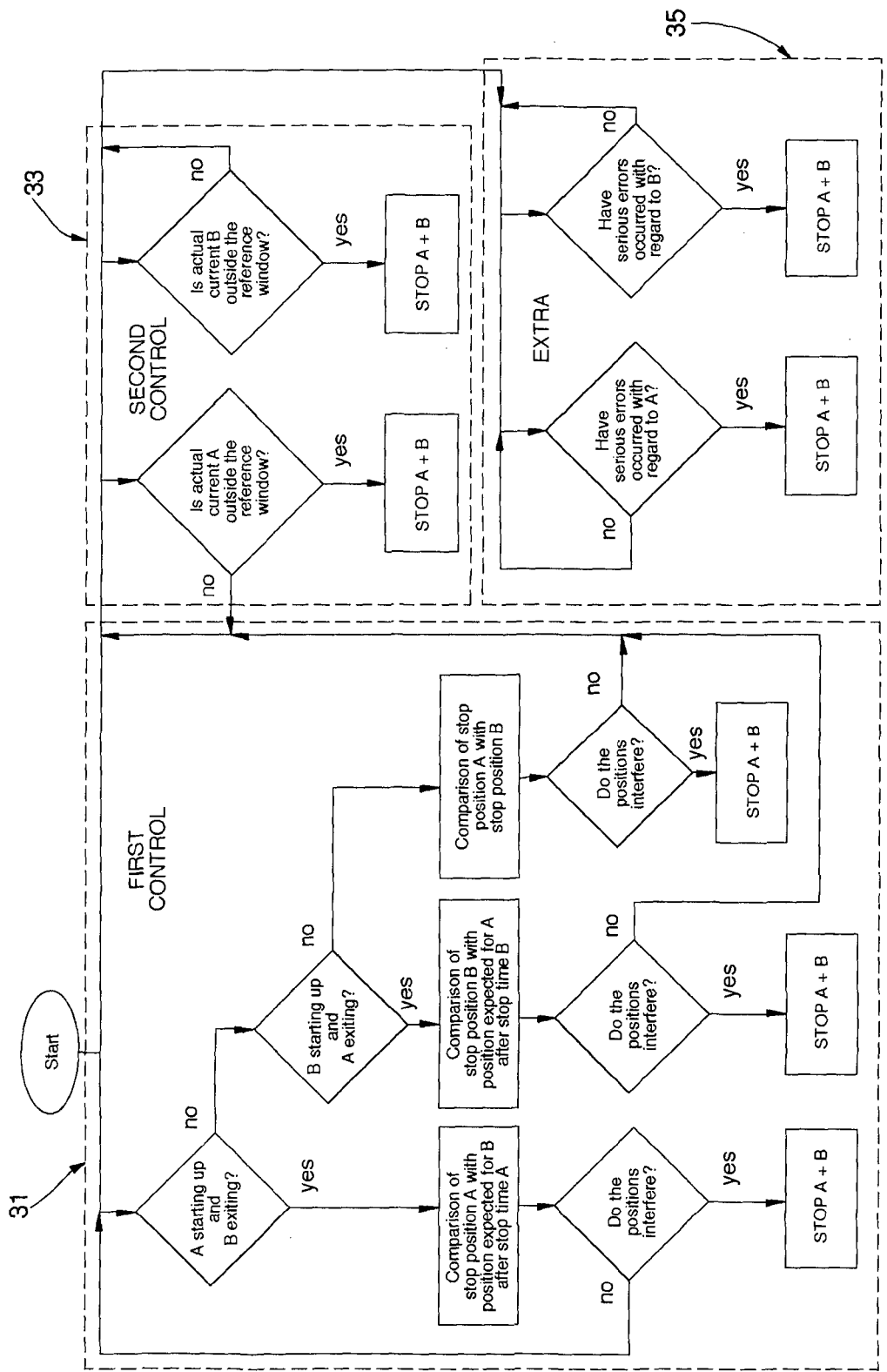
FIG. 11 is a block diagram of a possible practical embodiment of the control method according to the present invention.

With reference to FIG. 11, the method to control the interference and collision of mechanical members moved by electric motors provides to consider individual pairs of operating units 11, 111. In particular, it was chosen to indicate the first mechanical member 17 of the first operating unit 11 by "A" and the second mechanical member 23 of the second operating unit 111 by "B".

The method shown in FIG. 11 includes a section associated with the first control, that is, an interference control 31, a section associated with the second control, that is, a collision control 33, and an extra section for managing errors 35. The extra section for managing errors 35 detects possible anomalies in functioning due to malfunctions or breakages inside the operating units 11, 111, 112, 113, 114 or the management and control unit 13.

The interference control 31, the collision control 33 and the extra section for managing errors 35 occur in parallel and simultaneously; moreover, the interference control 31 occurs for every possible pair of operating units 11, 111, 112, 113, 114 that can interfere with each other.

It is clear that modifications and/or additions of parts may be made to the method to control interferences and collisions as described heretofore, without departing from the field and scope of the present invention.

It is also clear that, although the present invention has been described with reference to some specific examples, a person of skill in the art shall certainly be able to achieve many other equivalent forms of method to control interferences and collisions, having the characteristics as set forth in the claims and hence all coming within the field of protection defined thereby.

The invention claimed is:

1. A method for preventing mechanical members of operating units from interferences and/or collisions within an operation cycle, the method comprising,
    preventing interferences, comprising,
        verifying positions of a mechanical member of at least one operating unit within a predetermined time period based on vectors, braking times and spaces, and acceleration times and spaces, and
    detecting collisions steps by verifying the current intensity supplied to an electric motor of the operating unit, comprising,
        dividing an operating cycle into sub-phases,
        setting a predetermined reference current intensity,
        setting a reference current intensity window having a minimum threshold and a maximum threshold for each sub-phase, wherein the predetermined reference current intensity is within the range of the reference current intensity window,
        identifying a current intensity error in absolute terms by comparing the current intensity with a reference current intensity within every sub-phase, and
        limiting the current supplied to the electric motor so that the current intensity error in absolute terms does not exceed the reference current intensity window.

2. The method of claim 1 further comprising the step of providing two operating units wherein each unit has an electrical motor working simultaneously with the motor of the other unit while in the operating cycle.

3. The method of claim 1 further comprising the step of providing two operating units wherein each unit has an electrical motor working serially with the motor of the other unit while in the operating cycle.

4. The method of claim 1, wherein the preventing interferences step is implemented continuously.

5. The method of claim 1, wherein the operating cycle of the at least one operating unit is divided into one or more sub-phases.

6. The method of claim 1 further comprising storing the reference current intensities in a database.

7. The method of claim 6, wherein the reference current intensity is self-learnt by the management and control unit based on a cadence of the operation cycle and the sub-phases.

8. The method of claim 7, wherein the detecting collisions steps further comprises, generating a correction factor for an acceleration caused by speed variations, stops, or re-starts of the operating unit and applying the correction factor to the reference current intensity.

9. The method of claim 1, wherein the step of detecting collisions further comprises providing a maximum limit of currents that the management and control unit is able to effectively supply during one or more sub-phases of the operating cycle.

10. The method of claim 5, wherein for one or more sub-phases, a maximum limit of current that can be supplied is defined.

11. The method of claim 1, wherein the management and control unit control the intensity of current supplied to each electric motor and blocks the current when the current exceeds the reference current intensity window.

12. The method of claim 1, wherein the operation cycle is expressed in one of the following: sub-phases of a hypothetical mathematical entity or a round angle, sub-phases of another reference drive shaft to be followed or of the drive shaft of the mechanical member itself.

13. The method of claim 1, wherein the operating cycle is expressed in sub-phases directly derived from the operation cycle time.

14. The method of claim 1, wherein, for one or more sub-phases, the reference current intensities are self-learnt.

15. The method of claim 14 further comprising storing in a database the self-learnt reference current intensities, wherein the database is able to be interrogated in order to compare the reference current intensities with the actual value of current supplied.

* * * * *